Nov. 20, 1945.  M. G. LEONARD  2,389,373
PROTECTIVE DEVICE FOR ELECTRICAL APPARATUS
Filed Oct. 24, 1942
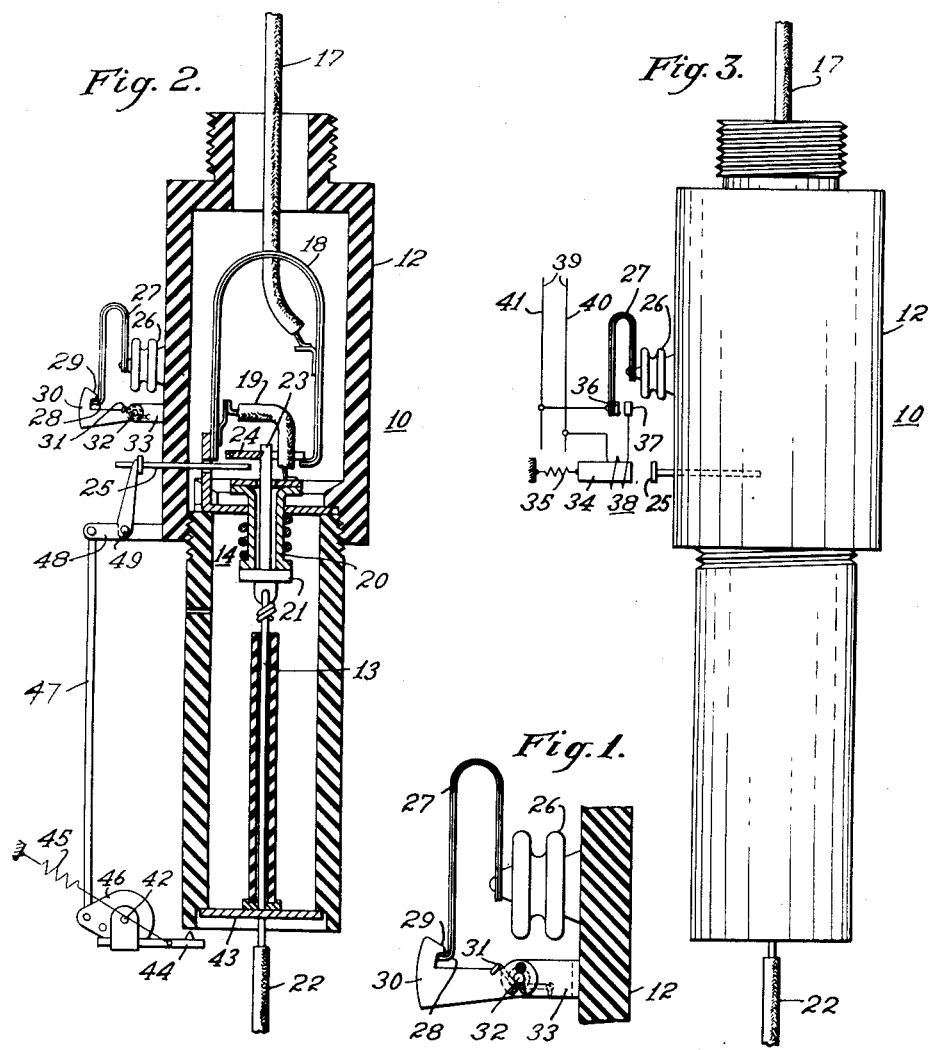
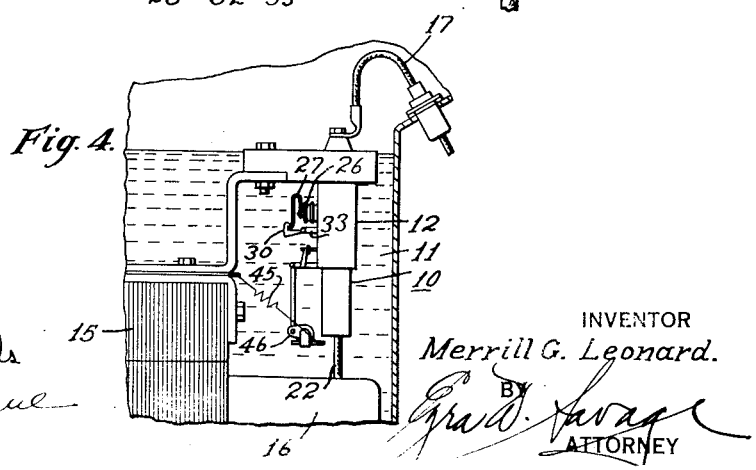
WITNESSES:
Edward Michaels
Nw. C. Groome
INVENTOR
Merrill G. Leonard.
BY
ATTORNEY Patented Nov. 20, 1945

2,389,373

UNITED STATES PATENT OFFICE 2,389,373

PROTECTIVE DEVICE FOR ELECTRICAL APPARATUS

Merrill G. Leonard, Sharon, Pa., assignor to Westinghouse Electric Corporation, East Pittsburgh, Pa., a corporation of Pennsylvania Application October 24, 1942, Serial No. 463,208

8 Claims. (Cl. 200—81.5)

The invention relates generally to protective devices for electrical apparatus and, more particularly, to protective devices for electrical apparatus which functions in response to the development of temperatures and pressures upon the occurrence of faults.

The object of the invention is to provide in combination with a fusible protective link for protecting the coils of electrical apparatus a pressure and temperature responsive device so disposed that they compensate one another under normal operating conditions, but function on the development of abnormal pressures or temperatures to effect the interruption of the coil circuits.

For a fuller understanding of the nature and scope of the invention, reference may be had to the following detailed description taken in connection with the accompanying drawing, in which:

Figure 1 is a view in side elevation of the protective device constructed in accordance with the teachings of this invention;

Fig. 2 is a view, partly in section and partly in side elevation, showing the invention applied in conjunction with a protective link;

Fig. 3 is a view in side elevation of a modification of the invention; and

Fig. 4 is a view, partly in section and partly in side elevation, showing the protective device disposed in a transformer.

Referring now to the drawing, and Fig. 2 in particular, the protective device constituting the subject-matter of this invention is shown in conjunction with a protective link such as disclosed in my copending application Serial No. 452,180, filed July 24, 1942, and assigned to the assignee of this invention. While the protective device of this application is shown in conjunction with a switching device such as disclosed in my copending application identified hereinbefore, it will be readily appreciated that it may be utilized in conjunction with any other type of switching device. The switching device of my copending application was selected since there is before the office a detailed description of the construction and function of this particular apparatus.

Since the functioning of the invention will be more readily understood if the construction and mode of operation of the switch are first explained, a brief description of the switching apparatus covered in my copending application will now be given.

The protective link shown generally at 10 is immersed or partially immersed in the body of dielectric 11 as illustrated in Fig. 4. In the building of transformers and other electrical apparatus provided with a liquid dielectric, it is common practice at the present time to provide a closed container, and in many instances the container for the dielectric is sealed.

The protective link 10 illustrated in Fig. 2 comprises a two-piece casing 12 which is generally made of some suitable insulating material, such as fiber. A fusible conductor 13 and a switch assembly 14 are disposed in the container.

The electrical apparatus to be protected, such as the transformer illustrated in Fig. 4, comprises a core 15 and coils 16. The protective link is connected between the coils 16 and the lead 17 connected to a transmission line (not shown). The circuit through the protective link may be traced as follows—the lead 17, bimetal 18, conductor 19, the sleeve and contact member 20, contact member 21, the fusible conductor 13, and the lead 22 to the coil 16.

As will be observed, the spring biased sleeve and contact member 20 stands in engagement with the contact member 21 when the rod 23 carrying the contact member 21 is held in its uppermost position by the latch 24. If the push rod 25 is moved to the right, the rod 23 is disengaged from the latch 24, and the biasing spring provided with sleeve 20 projects the contact member 21 downwardly, and the momentum acquired by the rod and contact member will cause them to continue to move downwardly after they are no longer under spring pressure and effect an interruption of the coil circuit.

The functioning of the fusible conductor 13 and the bimetal 18 will not be described, since they function independently of the present invention. It will be noted that the bimetal 18 is connected in circuit relation with the coils and is heated by the flow of current.

In the operation of transformers and other electrical apparatus, faults may occur which may not cause the fusible conductor 13 or the bimetal 18 to function. However, these faults may result in appreciable damage to or even the burning out of the electrical apparatus, and provision should be made for disconnecting the electrical apparatus from the circuit under such operating conditions.

The present invention comprises a bellows 26 which may be made from Sylphon tubing or other suitable bellows material which will expand and contract with changes in pressure. The Sylphon tubing may be selected to respond to predetermined pressures. As illustrated, the bellows is mounted on the tubular case 12 of the protective link. Any suitable method, such as riveting the bellows 26 to the case 12, may be employed.

The bimetal 27 may be made from any suitable bimetal material commonly employed in this art. Since bimetal materials are so well known, a detailed description will not be given. It will be sufficient to state that the bimetal is selected to move in the direction required upon change in temperature. It will also be readily appreciated that the bimetal may be so selected or designed that it will have a predetermined amplitude of movement for predetermined changes in temperature which will compensate for the movements of the bellows 26, resulting from a predetermined range of changes in pressure. In this manner, the bellows 26 and bimetal 27 may be made to compensate for the movements of one another within a predetermined range resulting from the changes in temperature and pressure which occur in the dielectric liquid within the limits permitted for the particular electrical apparatus being protected.

As illustrated, the bimetal 27 is provided with an outwardly turned projection or latch 28 which engages an inwardly turned projection 29 provided on a pivotally mounted striking arm 30. In this particular instance, the striking arm is biased in a counterclockwise direction by a spring 31. As shown, the striking arm 30 is pivoted at 32 on a bracket 33 also mounted on the case 12 of the protective link.

In this particular embodiment of the invention, the bimetal member 27 employed is U-shaped. In designing the member 27, the bimetal is so disposed that the legs of the U-shaped member will move apart upon increase in temperature.

As shown in Fig. 2, the striking arm 30 is disposed in alignment with the push rod 25. Therefore, upon the release of the striking arm 30 under the pressure of the biasing spring 31, it will swing downwardly and strike the push rod 25, moving it horizontally against the rod 23. The rod 23 is released from the latch 24, and in the method described hereinbefore, the contact members 20 and 21 are operated interrupting the circuit through coil 16.

In the operation of electrical apparatus, such as a transformer, when the loading increases from say 25% to 100%, the temperature of the copper and iron of the transformer will increase. This results in an increase in temperature of the dielectric liquid generally employed for cooling purposes. The transformer is designed to stand such increases in temperature, and the protective device of this invention should not function under such operating conditions of temperature and pressure.

Under the operating conditions to which a transformer is generally exposed when the temperature of the dielectric rises as a result of a load which does not exceed rated capacity, the pressure in the dielectric when in a closed container will also increase. Therefore, as the temperature rises, the pressure responsive member 26 will be compressed, and the point at which the bimetal 27 is mounted on the pressure responsive member 26 will move laterally. If the bimetal member did not respond to a rise in temperature, the striking arm would be released and the switch opened during an operation within predetermined ratings for the electrical apparatus. However, since the bimetal is so designed that the legs of the U-shaped member spread with rise in temperature, the leg having the outwardly extending projection 28 or latch will move outwardly, retaining the striking arm latched in its uppermost position.

Since any one skilled in the art can design the pressure responsive member 26 and temperature responsive member 27 to compensate for one another when exposed to operating conditions within the predetermined rating of the electrical apparatus to be protected, it is deemed unnecessary to give specific examples. Further, a different design of temperature and pressure responsive members will have to be made for each set of operating conditions.

Assume now that a stewing arc occurs which may result in the burning out of the electrical apparatus. The liquid dielectric is decomposed by the arc and large quantities of gas generated. This gas is generated without a corresponding rise in temperature. The result is that the pressure builds up quickly, and the pressure responsive member 26 is compressed out of all proportion with the compensating action of the temperature responsive member 27. Therefore, the striking arm 30 is released, and under the action of the biasing spring 31 is swung down into engagement with the push rod 25. When the rod 23 is unlatched, the contact members 20 and 21 are separated interrupting the coil circuit.

In the modification of the invention illustrated in Fig. 3, electrical means to effect the opening of the switch is substituted for the striking arm 30. As illustrated, a plunger 34 is so disposed that it is held out of engagement with the push rod 25 by means of a spring 35. A contact 36 is mounted on the outer arm of the U-shaped temperature responsive member 27. A stationary contact member 37 is disposed in alignment with the contact member 36 carried by the member 27. The electromagnet shown generally at 38 and provided with an armature or plunger 34 is connected across an independent current source of electrical energy 39.

The operation is the same as described for the modification of the invention illustrated in Figs. 1 and 2. If the temperature of the dielectric rises during normal operation, there will be a corresponding rise in pressure. When the pressure responsive member 26 is compressed, the temperature responsive member 27 will expand and the contact members 36 and 37 will not be brought into engagement. Therefore, the electrical apparatus will not be disconnected from the line during normal operation. Assuming now that the pressure is suddenly increased as a result of the generation of quantities of gas by a stewing arc or the like, then the pressure responsive member 26 will be compressed without a corresponding expansion of the temperature responsive member 27. Contacts 36 and 37 will be brought into engagement and a circuit established that may be traced from one side of the source of power 39 through conductor 40, the actuating coil of the electromagnet 38, contact members 37 and 36, and conductor 41 back to the other side of the source of power. The armature of the electromagnet will be actuated into engagement with the push rod 25 and the switch operated in the manner described hereinbefore in the preferred embodiment of the invention shown in Figs. 1 and 2.

In this manner, a protective device is provided having a fusible conductor 13 which will fuse if subjected to a fusing current, a bimetal member

18 which will respond to a heavy overload current, and a compensated unit which will respond to increases in pressure resulting from the generation of gas by a stewing arc or other similar faults.

The present device may be applied to polyphase systems—in such case, a protective device would be connected in circuit relation with each phase of the apparatus to be protected. A shaft 42 will be provided as disclosed in my copending application identified hereinbefore. When the switch of one protective device is actuated as described hereinbefore, an arc will occur between the contact members 20 and 21, and gas will be generated with the result that the bottom plate 43 will be blown from the case 12 carrying with it the arm 44. As the arm 44 rotates clockwise about the axis of the shaft 42, the spring 45 will be moved across dead center, and the shaft rotated through a predetermined angle. As the shaft rotates, the cam-shaped member 46 will be rotated clockwise, actuating the push rod 47 upwardly, turning the bell crank 48 about its axis 49 and operating the push rods of the protective links provided in the other phases of the system.

In conclusion, it is pointed out that, while the illustrated example constitutes a practical embodiment of my invention, I do not limit myself to the exact details shown, since modifications of the same may be considerably varied without departing from the spirit of the invention as defined in the appended claims.

I claim as my invention:

1. In a protective device for electrical apparatus provided with electrical coils and a body of dielectric disposed in a closed container, in combination, a switch connected in circuit relation with the coils, means for operating the switch, a pressure responsive device disposed to receive the pressures developed in the dielectric, a temperature responsive device disposed to operate upon changes in temperature in the dielectric, the pressure and temperature responsive devices being disposed to compensate for the operations of each other within a range resulting from temperature and pressure changes caused by the operation of the electrical apparatus within predetermined limits, the pressure and temperature responsive devices serving to control the functioning of said switch operating means, whereby the switch is actuated only when the operating conditions are outside of the predetermined limits established for the electrical apparatus.

2. In a protective device for electrical apparatus provided with a body of dielectric disposed in a closed container, in combination, switching means connected in circuit relation with the electrical apparatus to be protected, means for causing the operation of the switching means, means responsive to pressure developed in the container and temperature in the dielectric for controlling the operation of the means for causing the operation of the switching means, the means responsive to pressure and the means responsive to temperature being disposed to compensate one another within predetermined limits, whereby the functioning of the means for causing the operation of the switching means does not occur until predetermined operating conditions develop.

3. In a protective device for electrical apparatus provided with a body of dielectric liquid in a closed container, in combination, a switch connected in circuit relation with the electrical apparatus to be protected, a pressure responsive member exposed to the pressures developed in the dielectric liquid, a temperature responsive member exposed to the temperatures of the dielectric liquid, and means for operating the switch, the pressure and temperature responsive members being disposed to control the operation of the switch and to compensate one another within predetermined limits, thereby to initiate the functioning of the operating means only upon the development of predetermined operating conditions.

4. In a protective device for electrical apparatus provided with a body of dielectric liquid in a closed container, in combination, a switch connected in circuit relation with the electrical apparatus to be protected, means for actuating the switch, a bimetal member disposed to respond to the temperature of the dielectric liquid, a pressure responsive member disposed to receive the pressure developed in the dielectric liquid, the pressure responsive member and the bimetal being associated with one another to control the operation of the switch actuating means, the pressure responsive member being disposed to contract upon increase in pressure and the bimetal to expand upon increase in temperature, the pressure responsive member and the bimetal thereby compensating for the movements of one another within a predetermined range, whereby operation of the switch operating means is initiated only upon the development of pressures and temperatures outside of said predetermined range.

5. In a protective device for electrical apparatus provided with a body of dielectric liquid in a closed container, in combination, a switch connected in circuit relation with the apparatus to be protected, a bellows member disposed to receive the pressure developed in the dielectric liquid, a bimetal member disposed to respond to the temperatures of the dielectric liquid, the bellows member and the bimetal being so disposed and proportioned that one compensates for the movement of the other within predetermined limits serving to control the operation of the switch whereby the switch is actuated only upon the development of operating conditions in the electrical apparatus which are not within the predetermined limits for which the apparatus was designed.

6. In a protective device for electrical apparatus provided with a body of dielectric liquid, in combination, a switch connected in circuit relation with the electrical apparatus to be protected, a bellows disposed to respond to pressures in the dielectric liquid, a bimetal disposed to respond to the temperatures developed in the dielectric liquid, the bellows member and bimetal being disposed to compensate for the movements of one another within predetermined limits, a switch actuating member latched in an inactive position by the bellows and bimetal, whereby said switch actuating member is released to operate the switch to disconnect the circuit through the electrical apparatus upon the development of predetermined operating conditions.

7. In a protective device for electrical apparatus provided with a body of dielectric liquid in a closed container, in combination, a switch connected in circuit relation with the electrical apparatus to be protected, a spring biased member disposed to effect the operation of the switch, a bellows member disposed to respond to pressures developed in the dielectric liquid, a bimetal disposed to respond to temperatures developed in the dielectric liquid, the bellows and bimetal being disposed to compensate the movements of one another within predetermined limits, whereby as the bellows decreases in volume upon the increase in pressure in the dielectric liquid, the bimetal expands upon increase in temperature, the bimetal serving to latch the switch actuating means in an inactive position and to release said switch actuating means upon the development of predetermined operating conditions in the electrical apparatus, thereby to interrupt the circuit through the electrical apparatus.

8. In a protective device for electrical apparatus provided with electrical coils and a body of dielectric liquid disposed in a container, in combination, a switch connected in circuit relation with the electrical coils, a spring-biased member disposed to effect the operation of the switch, a bellows member disposed to respond to pressures developed in the dielectric liquid, and a bimetal member disposed to respond to temperatures developed in the dielectric liquid, the bellows and bimetal being disposed to compensate the movements of one another within predetermined limits, the bellows member decreasing in volume upon increase in pressure of the dielectric liquid, the bimetal expanding upon increase in temperature, the bimetal serving to latch the spring-biased member in an inactive position and to release the spring-biased member upon the development of predetermined operating conditions in the electrical apparatus thereby to actuate the switch to interrupt the circuit through the electrical apparatus.

MERRILL G. LEONARD.